Oct. 5, 1954            J. WEGENER            2,691,128
CONTACT CONVERTER
Filed Sept. 26, 1951
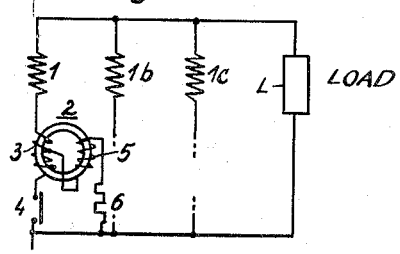
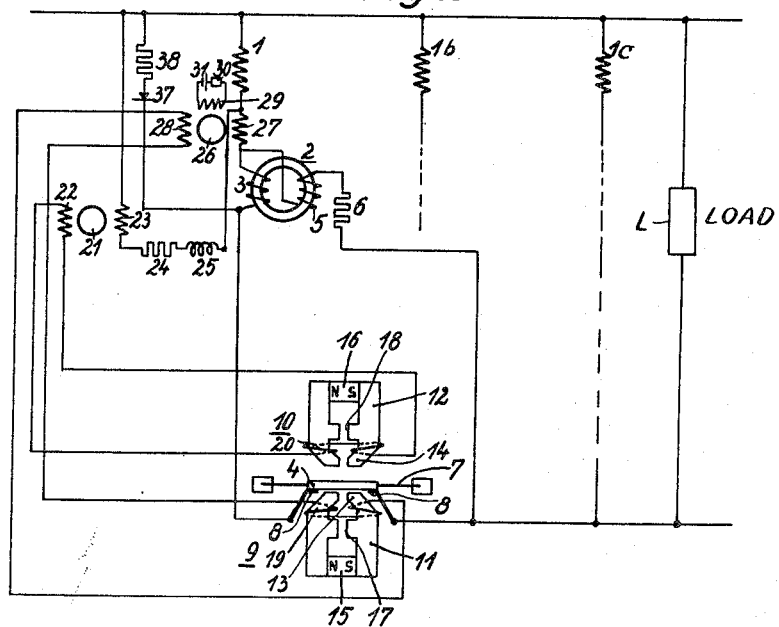
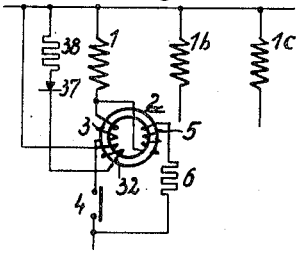
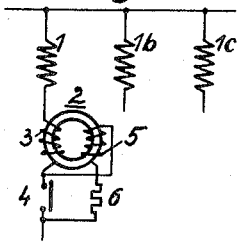
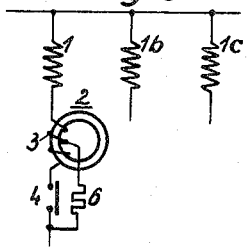
*Inventor:*
Johannes Wegener
BY Knight Bros.
ATTORNEYS Patented Oct. 5, 1954

2,691,128

UNITED STATES PATENT OFFICE 2,691,128

CONTACT CONVERTER

Johannes Wegener, Berlin-Siemensstadt, Germany, assignor to Siemens-Schuckertwerke Aktiengesellschaft, Berlin-Siemensstadt, Germany, a corporation of Germany Application September 26, 1951, Serial No. 248,338

7 Claims. (Cl. 321—48)

My invention relates to electric converting apparatus operating with synchronous switching devices in series-connection with saturable switching reactors which flatten the current wave near its zero passages to then reduce the instantaneous current to slight or negligible values during an interval of time in which the switching devices open or close the circuit.

Such apparatus, usually called "contact converters," are known in two types both amenable to the invention. In the converters of one type the switching devices are controlled mechanically by a synchronous motor energized from the supply of alternating current to be converted. The converters of the other type have their switching devices individually controlled by electromagnetic means. Such switching devices may be designed, for instance, for response to current impulses. According to one of the available switches of this kind, a contact-actuating armature is held attracted by the holding flux of a magnet in opposition to an armature-biasing spring. The holding magnet has a releasing winding which, when excited by a switching-out pulse, causes a weakening or virtual disappearance of the holding flux, for instance by imposing a counterexcitation upon the magnet. As a result, the biasing spring now swings the armature to another position. In that position, the armature is within the effective field range of a second holding magnet which retains the armature until a winding on the second magnet receives a switching-in pulse and produces a magnetic counterexcitation of sufficient strength to virtually eliminate the holding flux of the second magnet. Then the armature, again torn away by its biasing spring, swings back into the field range of the first holding magnet to be retained thereby. This cycle of operations is repeated in synchronism with the wave of the current being switched.

To make the operation of such contact converters with impulse-controlled switches independent of the rotating field of the energizing power supply, all circuits of same phase must be dependent only upon (1) the pertaining phase voltage or a voltage proportional thereto and/or (2) the direct voltage of the contact converter, if used for rectification, or a separate direct-current voltage. Various circuits are available for satisfying these requirements. For instance, the switching-out pulses can be made dependent upon the voltage of the saturable switching reactor so that these pulses are indirectly dependent upon the current to be interrupted; or the current to be interrupted may be passed through a saturable transformer whose secondary winding provides the switching-out pulse. The switching-in pulses may also be produced by saturable transformers whose primary winding is excited by the pertaining phase voltage, active or reactive impedances being provided for phasing the primary transformer current so that the switching-in pulses occur at the correct moments.

As mentioned, contact converters of the types here involved have a saturable commutating reactor series-connected with the contacts of each switching device. If this reactor is not equipped with a properly energized premagnetizing bias winding, the "step-current," i. e. the residual small current obtaining during the flattened near-zero steps or "switching intervals" of the current wave is negative, considering the load current to be positive. It is desired, however, to keep the step current zero or slightly positive. For that reason, the commutating reactors have been equipped with premagnetizing bias windings, and various circuit arrangements have become known for exciting these bias windings.

It is an object of my invention to improve and greatly simplify electric contact converters as regards the just-mentioned means for providing a reliable reactor premagnetization to secure zero or slightly positive valves of the residual currents during the switching intervals.

To this end, and in accordance with a feature of my invention, the premagnetizing bias excitation of the commutating reactor is made dependent upon the sum of the reactor voltage and the voltage across the gap of the series-connected contact device.

According to one of the more specific features of the invention, a premagnetizing winding of the commutating reactor is series-connected with a resistor in parallel relation to the main reactance winding of the reactor and the contact gap of the switching device. According to other features of my invention, the just-mentioned connection may be modified by joining the premagnetizing reactor winding with an intermediate tap point of the main reactor winding or, in special cases, with the end of the main winding adjacent to the switching device.

According to another feature of my invention, the main reactor winding serves also as a premagnetizing winding by having part of it connected parallel to the contact gap of the pertaining switching device. Since in all these cases the reactor premagnetization is dependent upon the sum of a reactor voltage and the contact-gap voltage, the performance of the converter is independent of the rotating field of the current supply line.

The foregoing and more specific objects and features of my invention will be apparent from the following description in conjunction with the drawing in which:

Fig. 1 shows schematically the basic circuit diagram of a contact converter embodying the principle and features of the invention;

Fig. 2 is a more detailed diagram of another embodiment of the invention; and

Figs. 3 to 5 show fragmentary diagrams of three respective modifications.

In Fig. 1, the three secondary windings of a three-phase power transformer are denoted by 1, 1b and 1c. The phase voltages induced in the respective secondary windings are 120° phase displaced from each other and are rectified by the converting apparatus to provide a direct-current voltage for a load L. Series connected between each transformer secondary and the load L is the main winding 3 of a saturable commutating reactor 2 and a synchronous switch represented by its contact device 4, only one of these series connections being illustrated as the two others are similar. The contact devices in the three phase circuits operate in sequential time relation with overlapping commutation intervals, each phase circuit being closed only during one of the half-wave periods of each current cycle. The contact devices, thus operating in synchronism with the current to be converted, may be controlled either mechanically by a synchronous motor or by electromagnetic means, an embodiment of a suitable drive being shown and described in detail in the following with reference to Fig. 2.

As mentioned, the saturable commutating reactor 2 in each phase of the converter circuit has the effect of flattening the current wave during intervals near its zero passages. This effect is due to the fact that the magnetizable core of the reactor is unsaturated at zero current so that the reactor main winding 3 has then a high reactance. At very slight instantaneous current values the reactor core becomes substantially fully saturated so that the reactance of winding 3 abruptly drops to a minimum and remains negligible during the major portion of the conductive period of the pertaining synchronous contact device. The switching of the contact device 4 in the opening and closing direction occurs during the interval or step thus produced by the reactor.

According to the invention, and as shown, the commutating reactor 2 in each phase circuit of the converter is equipped with a premagnetizing bias winding 5 which is series connected with an ohmic resistor 6 in parallel relation to the series connection of the contact device 4 with a tapped-off portion of the reactor main winding 3.

If $w_2$ denotes the number of turns of the portion of the reactor main winding 3 that is connected to the contact device 4; while $w_1$ denotes the turn number of the remaining winding portion, $w$ the total number of turns ($w_1+w_2$) of the main winding, $w_v$ the turns number of the premagnetizing winding 5, is $i_v$ the premagnetizing current in winding 5, $i_k$ the current flowing through the contact device 4, and $i_{st}$ the step current obtaining without premagnetization (i. e. when $i_v$ is zero), then the current $i_k$ flowing through the contact device 4 is determined by the equation:

$$i_k = i_{st} + \frac{w_1 \pm w_v}{w_1+w_2} \cdot i_v$$

The plus sign or the minus sign in this equation applies depending upon the selected winding sense of winding 5 relative to that of winding 3. It will be recognized from the equation that, by correspondingly selecting the number of winding turns and the magnitude of the premagnetizing current $i_v$, the step current $i_k$ can be made zero or slightly positive, the magnitude of $i_k$ being determined by the resistance magnitude of resistor 6.

The converter shown in Fig. 2 has a three phase converter circuit basically similar to that of the above-described embodiment of Fig. 1, the circuit elements denoted in Fig. 2 by reference numerals between 1 and 6 being in accordance with the correspondingly designated elements in Fig. 1. It will be recognized, however, that in the embodiment of Fig. 2, the premagnetizing winding 5 of the saturable reactor 2 and the ohmic series resistor 6 are connected in parallel relation to the entire main winding 3 and the contact device 4. Consequently, $w_1 \equiv 0$, and the current $i_k$ through the contact device is determined by the equation:

$$i_k = i_{st} \pm \frac{w_v}{w} \cdot i_v$$

For securing a slightly positive value of the step current, the winding sense of the premagnetizing winding 5 relative to that of the main winding 3 is to be chosen so that the positive sign of the equation is applicable.

In the embodiment of Fig. 2, the contact device 4 is electromagnetically controlled by current pulses and consists essentially of a ferromagnetic armature which is elastically suspended, for instance by spring wires 7, and cooperates electrically with stationary contacts 8. The armature may have its underside coated with an electrically good conducting material. The operation of the contact device is controlled by two holding magnets 9 and 10. Each comprises a magnetic circuit 11 or 12 with pole shoes 13 and 14, a permanent magnet 15 or 16, and a magnetic shunt 17 or 18 acting in magnetic parallel relation to the pole shoes of each magnet system. Each magnet has a winding 19 or 20. The winding 20 (switch-on winding) of magnet 10 is excited from the secondary winding 22 of a saturable transformer 21 whose primary winding 23 is series connected with an ohmic resistor 24 and a choke coil 25 across the transformer winding 1. The secondary 23 of transformer 21 issues pulses to the magnet winding 20. By suitably dimensioning the circuit resistances, these switch-on pulses can be made to occur at the correct moments.

The winding 19 (switch-off winding) of magnet 9 is connected with the secondary winding 28 of another saturable transformer 26 whose primary winding 27 is series connected with the main winding 3 of the commutating reactor 2. Transformer 26 is further equipped with a premagnetizing winding 29 which is excited through a resistor 30 from a suitable source 31 of direct current to secure issuance of the switch-off pulse shortly before the beginning of the current step.

The two saturable transformers 21 and 26 which, as shown, may have a toroidal core, are unsaturated at zero current but operate within their range of saturation as soon as the primary current assumes slight instantaneous values. Consequently, a sharp pulse is induced in the pertaining secondary transformer winding and this pulse, as explained, is applied to the switch-on winding or switch-off winding of the magnetic control devices that operate the synchronous switch contact.

When the switch-on winding 19 on magnet 9 receives a pulse, it induces in the magnetic circuit a flux opposed to that of the permanent magnet 15. Consequently, the magnetic holding force of magnet 9 is suddenly reduced so that the biasing suspension springs 7 swing the armature to the open position. Due to its momentum, the armature moves beyond the zero bias position into the effective field range of the magnet 10 which then retains the armature 4. When thereafter the switch-on winding 20 receives a pulse, the flux passing from the permanent magnet 16 through the armature is weakened so that the biasing springs become again effective to move the armature 4 toward the other holding magnet 9 where the armature 4 is again caught by the magnet field.

For back magnetizing the switching reactor 2 prior to the closing of the contact device so that the reactor is within its range of saturation as soon as the contact device is closing, the reactor main winding 3 may be connected in a loop circuit which extends through the transformer winding 1 and includes a valve 37 and a resistor 38 as shown in Fig. 2. This has the effect that during the negative half wave of the phase voltage, the main winding 3 of reactor 2 is traversed by such a current that the reactor is back magnetized and is again saturated when the phase current is switched-on by the contact device 4.

While thus according to Fig. 2, the reactor main winding 3 is utilized for providing back magnetization of the saturable switching reactor, this purpose may also be served by a separate back magnetizing winding 32 as shown in Fig. 3, the apparatus being otherwise designed and operative in accordance with the above-described embodiment of Fig. 2.

The premagnetizing winding 5 of the saturable commutating reactor may be connected to the reactor main winding at points other than described so far. For instance, in distinction from the embodiment of Fig. 1, the converting apparatus according to Fig. 4 has the premagnetizing winding 5 connected to the end of the main winding 3 at the side of the contact device 4. With such a connection $w_2=0$ and the current $i_k$ through the contact device is determined by:

$$i_k = i_{st} + \frac{w \pm w_v}{w} \cdot i_v$$

It is not always necessary to use an additional premagnetizing winding 5 on the saturable commutating reactor. As shown in Fig. 5, the main winding 3 of the reactor 2 may directly be employed as a premagnetizing winding by connecting a portion of this winding in series with an ohmic resistor 6 parallel to the contact device. In such a case, $w_v=0$, and the current $i_k$ flowing through the contact corresponds to:

$$i_k = i_{st} + \frac{w_1}{w_1 + w_2} \cdot i_v$$

It will be understood that the modifications illustrated in Figs. 4 and 5 may otherwise be similar to the embodiments previously described.

It will be obvious to those skilled in the art from a study of this disclosure that my invention permits of various modifications other than those specifically illustrated and described without departing from the essential features of my invention as set forth in the claims annexed hereto.

I claim:

1. A contact converter, comprising an alternating-current main circuit, a synchronous switching device for periodically breaking said circuit near alternate current zero passages, a saturable commutating reactor having a reactance winding series-connected with said switching device in said main circuit and being unsaturated near said current zero passages to provide low-current step intervals including the respective circuit-breaking moments of said switching device, premagnetizing means inductively linked with said reactor for modifying said intervals and having a premagnetizing circuit attached to a circuit point of said winding and extending from said point in parallel relation to said switching device to provide premagnetizing current dependent upon the contact voltage of said switching device and the voltage of said winding effective in said circuit.

2. In a contact converter according to claim 1, said premagnetizing means comprising a bias winding on said reactor and an ohmic resistor series-connected with said bias winding across said switching device.

3. In a contact converter according to claim 1, said premagnetizing means comprising a portion of said reactance winding and an ohmic resistor series connected with said winding portion across said switching device.

4. A contact converter, comprising an alternating-current main circuit, a synchronous switching device for periodically breaking said circuit near alternate current zero passages, a saturable commutating reactor having a reactance winding series-connected with said switching device in said main circuit and being unsaturated near said current zero passages to provide low-current step intervals including the respective circuit-breaking moments of said switching device, a premagnetizing circuit inductively linked with said reactor for modifying said intervals and comprising an ohmic resistor, said latter circuit extending from a circuit point of said reactance winding to a point of said main circuit at the reactor-opposite side of said switching device so that its current depends only upon the contact voltage of said switching device and the voltage of said reactance winding.

5. A contact converter, comprising an alternating-current main circuit, a synchronous switching device for periodically breaking said circuit near alternate current zero passages, a saturable commutating reactor having a reactance winding series-connected with said switching device in said main circuit and being unsaturated near said current zero passages to provide low-current step intervals including the respective circuit-breaking moments of said switching device, premagnetizing means inductively linked with said reactor for modifying said intervals and having a premagnetizing circuit containing ohmic resistance and being exclusively energized by current from said main circuit, said premagnetizing circuit extending from a point of said main circuit at the side of said winding away from said switching device to a point of said main circuit at the reactor-opposite side of said switching device.

6. A contact converter, comprising an alternating-current main circuit, a synchronous switching device for opening said main circuit near a zero passage of the alternating current, a saturable commutating reactor having a reactance winding series-connected with said switching device in said main circuit to provide near said zero passage a low-current step interval including the opening moment of said device, said reactor having a premagnetizing winding for modifying said intervals, and a premagnetizing circuit including said premagnetizing winding, said premagnetizing circuit extending across said switching device and at least part of said reactance winding and having a current dependent upon the sum of the voltage of said winding part and the voltage across said switching device.

7. A contact converter, comprising an alternating-current main circuit, a synchronous switching device for opening said main circuit near a zero passage of the alternating current, a saturable commutating reactor having a reactance winding series-connected with said switching device in said main circuit to provide near said zero passage a low-current step interval including the opening moment of said device, said reactor having a premagnetizing winding for modifying said intervals, and an ohmic resistor series-connected with said premagnetizing winding across the series-connected reactance winding and switching device.

References Cited in the file of this patent

UNITED STATES PATENTS

| Number | Name | Date |
| --- | --- | --- |
| 2,465,682 | Goldstein | Mar. 29, 1949 |
| 2,466,864 | Prati | Apr. 12, 1949 |
| 2,568,140 | Belamin | Sept. 18, 1951 |

FOREIGN PATENTS

| Number | Country | Date |
| --- | --- | --- |
| 52,280 | France | Dec. 1, 1943 |